United States Patent [19]

Dorris

[11] 4,371,362
[45] Feb. 1, 1983

[54] TRACK ROLLER SYSTEM

[76] Inventor: F. Hoyt Dorris, 516 Rocky Point Rd., Cordova, Tenn. 38018

[21] Appl. No.: 136,680

[22] Filed: Apr. 2, 1980

[51] Int. Cl.³ .......................... B62D 55/14; B60B 7/04
[52] U.S. Cl. .................................... 474/198; 474/184; 474/901; 474/902; 29/124; 301/13 SM; 305/23; 403/381
[58] Field of Search ........................ 474/166, 184–187, 474/901, 902, 198; 29/124, 125, 130; 301/9 R, 13 SM, 31, 35 SS; 305/23, 57; 403/381, 319

[56] References Cited

U.S. PATENT DOCUMENTS

| | | | |
|---|---|---|---|
| 661,617 | 11/1900 | McCanna | 29/124 |
| 716,555 | 12/1902 | King | 29/124 |
| 978,080 | 12/1910 | Vieser | 29/124 |
| 1,264,426 | 4/1918 | Nichoson | 29/124 |
| 1,275,670 | 8/1918 | Fry et al. | 474/187 |
| 1,289,602 | 12/1918 | Baehr | 29/125 |
| 1,871,007 | 8/1932 | Raisch | 29/124 |
| 2,489,803 | 11/1949 | Neilsen | 29/123 |
| 3,071,417 | 1/1963 | Militana | 301/44 R |
| 3,154,958 | 11/1964 | Cadwell et al. | 474/901 |
| 3,237,991 | 3/1966 | Hurst | 301/13 SM |
| 3,580,093 | 5/1971 | Tomizawa | 474/901 |
| 3,869,931 | 3/1975 | Boggs | 474/901 |
| 3,910,128 | 10/1975 | Boggs et al. | 474/901 |
| 3,937,528 | 2/1976 | Clemens et al. | 474/184 |
| 4,034,618 | 7/1977 | Groff et al. | 474/184 |
| 4,229,117 | 10/1980 | Coppin et al. | 474/902 |

FOREIGN PATENT DOCUMENTS 102297 8/1962 Netherlands ..................... 474/187

Primary Examiner—Lawrence J. Staab
Attorney, Agent, or Firm—Bacon & Thomas

[57] ABSTRACT

A track roller system includes a replaceable rim assembly made up of two groups of multi-segments held to the hub in axially spaced position by a multi-segment retainer in the central space between the groups of rim segments, the rim segments retained against endwise movement on the hub by central locking surfaces, and the retainers held to the hub by removeable fasteners.

5 Claims, 3 Drawing Figures

TRACK ROLLER SYSTEM

TECHNICAL FIELD OF THE INVENTION

This invention relates to a track roller system for endless track vehicles, and more particularly to a replaceable rim for such track rollers.

BACKGROUND OF THE INVENTION

It is well known that track rollers for endless track vehicles are subject to high wear and require frequent repair or replacement. In actuality, failure of the rim portion of the roller is the usual cause for such repair or replacement, and it has been recognized that a replaceable rim arrangement for the track roller would provide an economic advantage, since the remaining roller structure would not need to be replaced because of failure of or damage sustained by the rim portion alone. Accordingly, replaceable rims are known in the prior art, for example, U.S. Pat. No. 3,154,958 discloses such as system, but such prior art replaceable rims tend to be complex and costly, involving multi-part hub assemblies, complex fastening arrangements, and cumbersome replacement procedures. As a rule, replacement of the rim portion of the hub involves disturbing the bearings and seals associated with the hub, and this makes the entire procedure more costly, since a disturbed seal usually must be replaced.

In viewing prior art replacement rim systems, one notes a remarkable lack of a simple and economical replaceable rim system that enables the rim portion of the roller to be replaced without disturbing or disassembling the various internal seals and bearings of the hub assembly. One also observes that a replaceable rim system should permit the rim element itself to be reworked or repaired for subsequent use if the rim is salvageable. Finally, one recognizes that the replaceable rim must be simple to install in the field where the vehicle is located with minimal use of special tooling or procedures.

BRIEF SUMMARY OF THE INVENTION

The replaceable rim system of this invention includes a shaped hub, segmented rim sections that fit over the hub in interlocking relationship, retainer segments for holding the rim segments in place on the hub, and fasteners for securing the retainer segments to the hub.

The hub has enlarged protrusions providing rim locking surfaces at its opposite ends that engage similar surfaces cut into the inner surfaces of rim segments that are placed about the hub adjacent its ends. A group of rim segments is located adjacent each end of the hub, each group being axially spaced apart on the hub to leave a central zone adapted to receive a segmented retainer.

The retainer segments and the adjacent rim segments are provided with cooperating bevel surfaces that are engaged when the retainer segments are secured to the hub by the fasteners. Due to the nature of the locking surfaces adjacent the ends of the hub, the rim segments are prevented from moving away from the hub and are locked against sliding movement past the ends of the hub by means of the retainer segments mounted over the central portion of the hub.

The retainer segments are provided with locking keys that engage cooperating keyways in the bevel surfaces of the rim segments so that the rim segments cannot turn about the hub. The cooperating bevel surfaces keep the rim segments engaged with the locking surfaces on the hub and retain the rim segments secured to the surface of the hub.

Accordingly, disassembly of the rim segments from the hub involve simply unfastening the retainer segments, removing the latter from the hub by lifting them free, and then lifting the rim segments directly off the hub and out of engagement with the locking surfaces at the hub ends. None of the bearings or seals associated with hub need be disturbed unless absolutely necessary, and the rim segments can be replaced, or reworked and repaired if this is desired.

DETAILED DESCRIPTION OF PREFERRED EMBODIMENT

DESCRIPTION OF THE DRAWINGS

With respect to the attached drawings.

DETAILED DESCRIPTION

Figure 1:
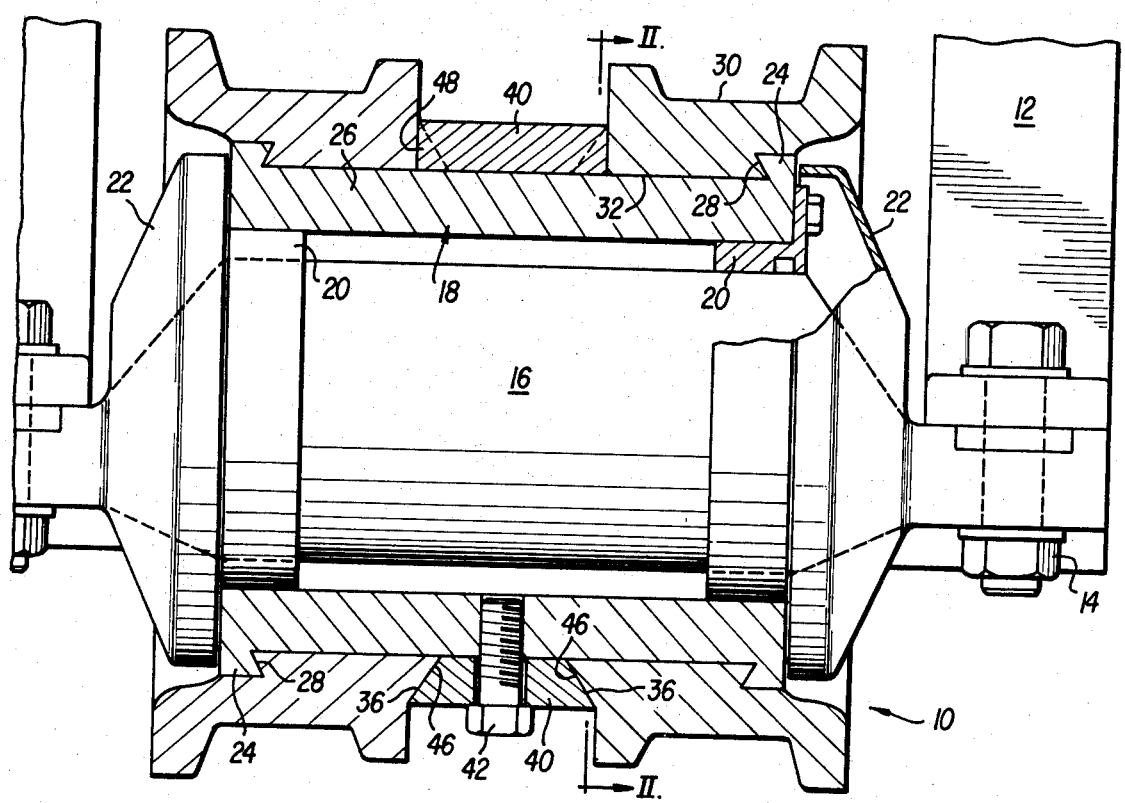
FIG. 1 represents a transverse sectional view of a track roller system according to the present invention, this view being taken along lines I—I of FIG. 2.

With reference to FIG. 1, a track roller assembly 10 is secured to a vehicle 12 by means of suitable fasteners 14 in a conventional manner. The track roller assembly includes a fixed central shaft 16 that is secured by fasteners 14 to the vehicle 12. Shaft 16 supports a rotatable hub 18 through bearing and seal assemblies 20 that are enclosed by protective end caps 22 that are fixed relative to the shaft 16.

The hub 18 is provided with enlarged protrusions 24 having a larger diameter than the central portion 26 of the hub 18. Hub locking surfaces 28 that extend in a generally radial direction away from the axis of the shaft 16 are therefore presented, and, in this embodiment, they slope towards the central portion 26 of the hub in a direction away from the axis of the shaft 16.

Rim segments 30 are provided with interior surfaces 32 that are contiguous with the outer surface of the central portion 26 of the hub 18. The rim segments 30 are arcuate in form and have axially and radially extending side faces 34 (see FIG. 3) that abut each other when the rim segments 30 are assembled over the central portion 26 of the hub 18. The side faces 34, it will be noted, substantially abut each other when the rim segments are assembled to the hub. As illustrated, there are a total of four rim segments utilized in the illustrated embodiment, although more segments could be used in each group. The two groups of rim segments are axially spaced along the central portion of the hub 18 and each of the segments includes its own rim locking surface that corresponds in size and shape to the locking surface 28 on the hub 18. For reference purposes, the locking surface on the rim is described as being located at the outer portion of the interior surface 32 of rim 30, while the opposite end of rim segments 30 are described as inner portions of the surface 32, since they are located "inwardly" or towards the central portion of the hub 18.

The ends of rim segments 30 located opposite the locking surfaces 28 are provided with a generally radially and longitudinally extending inner end faces including beveled surface areas 36 that slant towards the hub axis in a direction towards the central region of the hub.

Located between the axially spaced groups of rim segments 30 are arcuate retainer segments 40 that are secured to the hub by means of replaceable fasteners 42. Like the rim segments 30, the retainer segments 40 are also provided with radially and longitudinally extending side faces 44 that abut each other when the retainer segments are assembled about the hub 18. As illustrated, the hub segments are equal in number to the rim segments, but it should be understood that any appropriate desired number of retainer segments could be utilized, provided that a suitable fastening arrangement for securing each segment to the hub is provided.

The retainer segments 40 each are provided with cooperating bevel end surfaces 46 that cooperate with the bevel surfaces 36 of the rim segments 30. Thus, it can be seen that, as each retainer segment is secured to the hub 18, the bevel surfaces 36 and 46 will cooperate in the manner of a cam and follower arrangement so that the rim segments 30 will each be urged axially to cause the locking surfaces 28 to engage each other and to cause the rim segments 30 to be retained against the hub 18.

Figure 3:
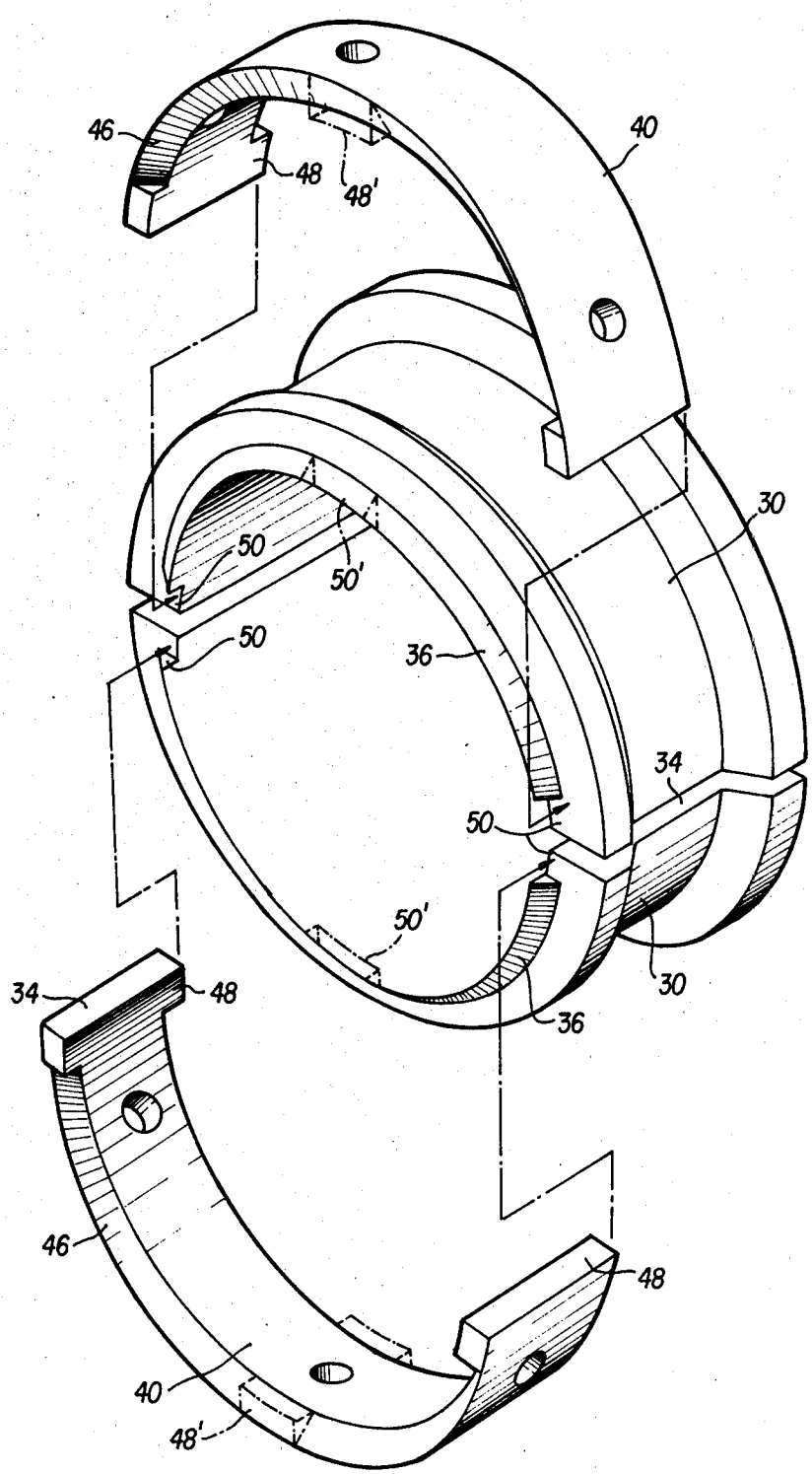
FIG. 3 is a fragmentary exploded perspective view of the rim and retainer segments of the invention.

The retainer segments 40 are furthermore provided with an axially extending key 48 that engages a counterpart axially extending keyway 50 in each rim segment 30, as best seen in FIG. 3. By means of the interlocking key and keyway, the segments 30, after they are assembled to the hub 18, are prevented from rotating relative to the hub. Alternate key 48' and keyway 50' are also shown in FIG. 3.

Figure 2:
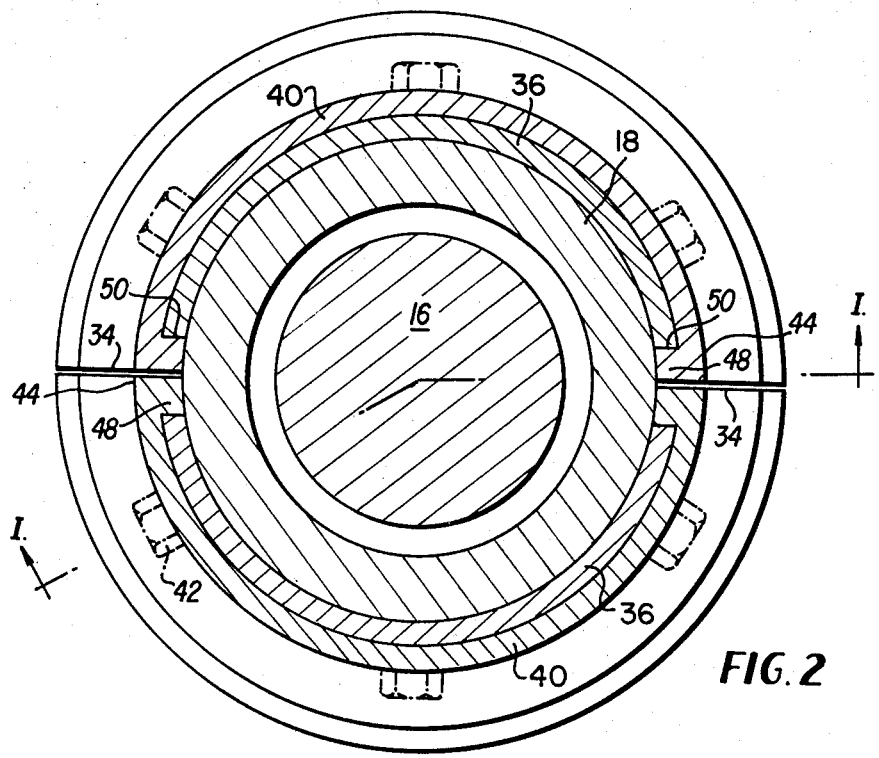
FIG. 2 is a cross-sectional end view of the track roller as viewed along line II—II in FIG. 1.

In operation, assuming that the track roller system is assembled as shown in FIGS. 1 and 2, disassembly of the rim segments simply entails removal of the fasteners 42 and lifting of the retainer segments 40 from the hub 18. Thereafter, the rim segments 30 are simply lifted directly away from the hub 18 without further disassembly or disturbance of the bearings and seals 20. Normally the rims 30 are replaced without disassembly of the track roller shaft from the vehicles 12.

It should be understood that various cam and follower surfaces could be substituted for the bevel surfaces 36, 46, but the bevel surfaces do offer strength and rigidity to the preferred embodiment. Also, the specific contour of the locking surfaces 28 at the hub ends could be varied to suit specific needs, but the inclined surfaces illustrated do provide the advantage of simplicity and ease of manufacture.

What is claimed is:

1. A track roller for an endless track vehicle, the roller comprising:
   (a) a hub having a longitudinal axis of rotation, a central outer surface area, and opposite axial end areas;
   (b) hub locking surfaces at each hub end area, said hub locking surfaces extending generally radially outwardly from the hub central outer surface area;
   (c) a replaceable rim assembly on the hub, the assembly comprising two groups of arcuate rim segments axially spaced on the hub, each segment having axially and radially extending side faces, the segments of each group forming an annular track roller rim half when joined together about the hub with said faces adjacent or abutting each other;
   (d) said rim segments having interior surfaces adapted to lie adjacent the hub outer surface, said interior surface including axially spaced inner and outer surface portions, said inner surface portions corresponding in shape to and adapted to fit over the hub central outer surface area, and said outer surface portions including generally radially outwardly extending rim locking surfaces adapted to engage said hub locking surfaces to provide an interference fit between said locking surfaces for preventing axial outward movement of each assembled track roller rim segment with respect to the hub, said rim segments including generally radially extending inner end faces, and said hub and rim locking surfaces also extending in a generally axial direction towards the central section of said hub; and
   (e) a removable retainer means arranged to fasten at least the ends of said rim segments opposite said rim locking surfaces relative to the hub and comprising a plurality of segments located within and spanning the axial space along the hub between said rim assemblies, and said retainer means including generally radially extending end surfaces that engage said inner end faces of said rim segments, said inner end faces of said rim segments and said end surfaces of said retaining means defining cam and follower surfaces;
   (f) removable fastener means for securing the retaining means relative to the hub;
   (g) said cam follower surfaces arranged to urge axially opposite rim segments axially apart towards said hub end areas when said removable fastening means is secured; and
   (h) rotation preventing key means for locking said rim segments against rotation relative to said hub.

2. A track roller according to claim 1 said rim assembly and retainer means each comprising a similar number of segments.

3. A track roller according to claim 1, said cam and follower surfaces comprising bevel surfaces that extend in inclined directions relative to the hub longitudinal axis.

4. A track roller according to claim 1, said rotation preventing key means engaging the inner end faces of said rim segments for preventing rotation of said rim segments relative to said hub about the hub axis.

5. A track roller according to claim 4, said inner end faces of said rim segments including an axially extending keyway, and said relative rotation preventing means comprising a locking key engageable in said keyway.

* * * * *